United States Patent [19]
Drees et al.

[11] 3,857,534
[45] Dec. 31, 1974

[54] MULTI-FREQUENCY HELICOPTER VIBRATION ISOLATION

[75] Inventors: Jan M. Drees, Dallas; David Shipman, Arlington, both of Tex.

[73] Assignee: Textron Inc., Providence, R.I.

[22] Filed: Apr. 2, 1973

[21] Appl. No.: 346,951

Related U.S. Application Data

[63] Continuation-in-part of Ser. No. 223,442, Feb. 4, 1972, abandoned.

[52] U.S. Cl............ 244/17.27, 248/358 R, 416/500
[51] Int. Cl............................................. B64c 27/04
[58] Field of Search............ 244/17.25, 17.27, 17.11, 244/137 R; 416/500; 248/358 R, 20, 15, 8, 18; 180/64 R, 64 L, 64 M

[56] References Cited
UNITED STATES PATENTS

| 3,379,397 | 4/1968 | Keady et al. | 248/20 |
| 3,514,054 | 5/1970 | Mard et al. | 244/17.27 |
| 3,698,663 | 10/1972 | Balke et al. | 244/17.27 |

Primary Examiner—Trygve M. Blix
Assistant Examiner—Paul E. Sauberer
Attorney, Agent, or Firm—Richards, Harris & Medlock

[57] ABSTRACT

A helicopter load supporting structure substantially vibration free from rotor induced vibration by support from the airframe on compound beams at multi-frequency nodal points.

7 Claims, 6 Drawing Figures

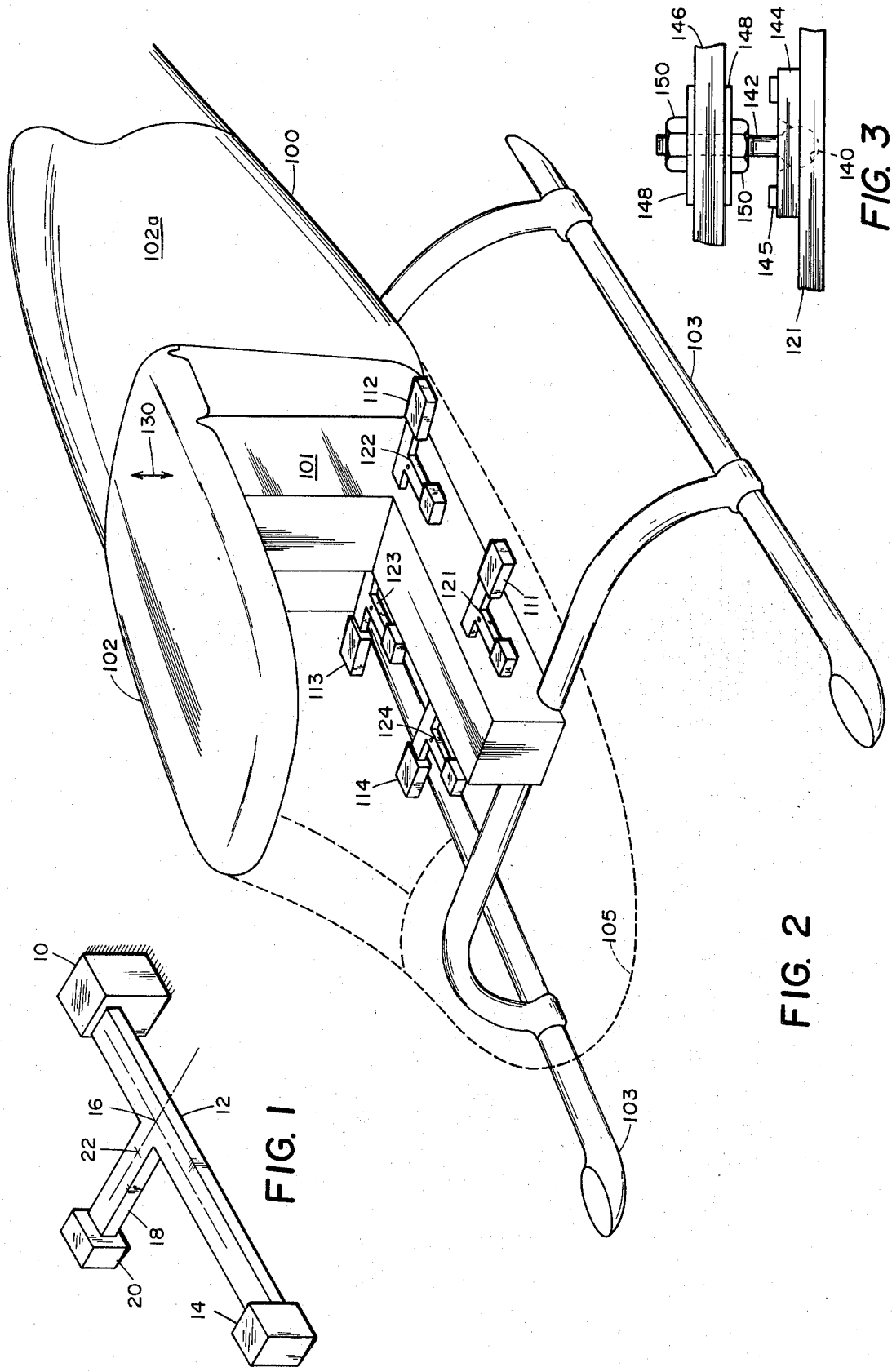

MULTI-FREQUENCY HELICOPTER VIBRATION ISOLATION

This application is a continuation-in-part of application Ser. No. 223,442, filed Feb. 4, 1972 and now abandoned.

This invention relates to helicopters, and more particularly to isolation at at least two frequencies of load carrying structure from main rotor induced vibrations.

Extensions of the flight speed range of helicopters aggravates the problem of vibration experienced by personnel and other loads. Such vibration becomes more pronounced at higher speeds. A rotor and lift module may include most of the load supporting structure and most of the fixed weight. It is highly desirable that the fuselage containing pilot accommodations, cargo and fuel be isolated from rotor induced vibration. Dynamic antiresonant vibration isolation and other vibration reduction for helicopters traditionally has been an objective difficult to achieve. The steady increase in forward velocity over the years has contributed to the problem. Now for various reasons, the acceptable tolerance level is lower than it used to be. New requirements limit vibration levels to ±0.05g, whereas the existing military specifications permit a level of ±0.15g, and many helicopters now flying vibrate more than ±0.20g in some flight regimes.

In accordance with copending application Ser. No. 189,945, filed Oct. 18, 1971, now abandoned, a cargo area or portions thereof are isolated from the dominant rotor harmonic. The present invention is an improvement over the invention described and claimed in said copending application.

In helicopters having a two blade rotor operated at rotor speeds of 300 cycles per minute, the dominant rotor harmonic is two per rev or 10 cycles per second. Higher harmonics of said dominant rotor harmonic are also significant and reduction of such higher harmonics is highly desirable. Isolation of pilot and copilot seats, cargo and fuel and other cabin portions from dominant and higher harmonics represents a significant challenge in design and construction.

The best technical solution to a vibration problem depends much on the circumstances. An articulated rotor requires a different approach than a teetering rotor. Adjustments to stiffness and damping may be constrained by the need to avoid mechanical instability, excessive transient oscillations, or excessive static deflections. A number of new isolation systems have been proposed or used, such as a focused pylon described in U.S. Pat. No. 3,163,378 and passive isolators, in contrast to active isolators which require control and power to drive at the proper amplitude and phasing.

The inplane shear forces causing increased vertical vibration can be isolated by soft-mounting the pylon or by constructing a focused pylon system above mentioned. Difficulty has been encountered in isolating the fuselage from the vertical shear forces using this method. Another means of reducing vibration in the fuselage has been to modify the forced response mode shape of the basic fuselage by changing its stiffness and-/or changing its mass distribution. A third method has been to change the fuselage mode shape by using a vibration suppressor. This method uses a fuselage mounted actuator to oscillate a mass in the vertical plane at a chosen rotor harmonic in order to produce a reaction to the rotor forces at that chosen harmonic. These latter two techniques benefit only certain areas of the fuselage.

Still another method has involved reduction of forcing functions through improved rotor design. However, this requires detailed and sophisticated rotor analyses generally not available. A further means, described in said copending application, involves isolation of the dominant rotor induced harmonic by hanging loads to the helicopter airframe at vibration nodal points.

Thus, prior methods include the following principles:

a. Design for a low fuselage response at the fundamental rotor frequency;
b. Pylon isolation by soft-mounting or focused pylon;
c. Forcing inflight node points into cabin area;
d. Reducing forcing functions by rotor flexures, use of rotor tip and rotor mid-weights, multiblade rotors and the like;
e. Nodal point coupling for dominant rotor harmonic isolation as set out in said copending application.

The present method involves a different structural relationship than involved in (e) above. A load bearing portion of the craft is attached only to points which are nodal points for the dominant main rotor induced harmonic and at least one higher harmonic.

More particularly, the present invention provides isolation from the dominant rotor harmonics and a higher harmonic by trans nodal isolation. This is accomplished by load attachment at forced response multi-frequency nodes on specially designed and installed sections of the fuselage, including forced response at the dominant main rotor harmonic. The selected nodal points are defined without reference to the fuselage and are spatial multi-frequency nodal points at the selected forcing frequencies.

More particularly, a primary fuselage beam extends in a plane which is perpendicular to the direction of vibration to be isolated and exhibits a vibration nodal point at a primary frequency. A secondary beam is cantilever supported from the primary beam at the nodal point and exhibits a vibrational nodal point at a location spaced from said primary beam and at a frequency which is a multiple of the primary frequency. A linkage extends from the second nodal point to a load.

For a more complete understanding of the present invention and for further objects and advantages thereof, reference may now be had to the following description taken in conjunction with the accompanying drawings in which:

FIG. 1 illustrates the principle upon which the invention is based;

FIG. 2 illustrates an embodiment of the invention;

FIG. 3 illustrates a coupling to the beams of FIGS. 1 and 2;

Figure 5:
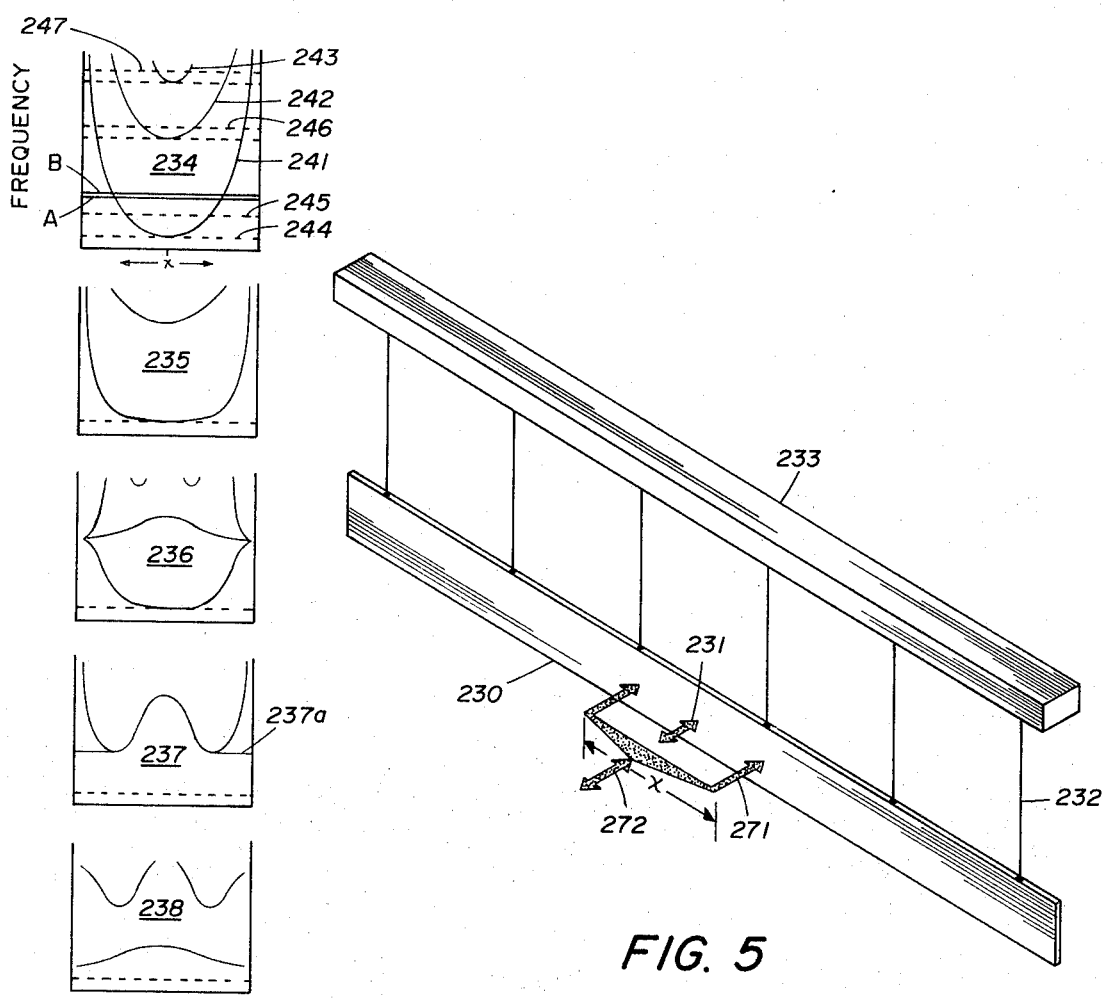
FIG. 5 illustrates beam drives to produce the vibrations represented in FIG. 4.

Referring now to FIG. 1, a multi-frequency isolation support structure involves a compound beam. A frame element 10 may form part of the fuselage to which the system of the present invention is anchored and from which it depends. Element 10 supports a primary beam 12 which has a mass 14 at the free end thereof. The beam 12 is a cantilever beam mounted at its base in the element 10. The beam will vibrate in response to rotor induced forces such that there will be a nodal point 16 between element 10 and mass 14. Even though the element 10 vibrates intensely and the mass 14 also experiences induced vibration, there will be little or no vibration at point 16.

In accordance with the invention, a second beam 18 is mounted on beam 12 and extends therefrom in the same plane as beam 12. A second mass 20 is mounted on the end of beam 18. Beam 18 is so designed that there will be a vibration nodal point 22 at a point along the length thereof.

Beam 12 preferably is tuned to 90 percent of the main rotor induced harmonics to be isolated so that the node 16 exists near the root of the beam. To beam 12 is attached a second beam 18 which is tuned to 90 percent of the higher frequency to be isolated. If the dominant main rotor harmonic is 2 per rev then a harmonic of frequent concern is the 6 per rev frequency. Thus, point 22 is a node for both frequencies.

To point 22, any mass may be attached with a high degree of isolation at both frequencies.

The nodalizer method of isolation provides isolation that is independent of the load being isolated. This is in contrast to shock mounts or elastomeric mounts where the isolation is dependent upon the mass being isolated.

The portion of the bar 12 between the nodal point 16 and the base 10 will vibrate in a torsional mode as well as a bending mode in view of the forces imposed upon beam 12 by vibration of mass 20 on beam 18. The beam 18 will vibrate in a bending mode. The beam 12 may thus be designed, taking into consideration its torsion spring rate plus its bending spring rate. Beam 18 may be designed, taking into account its bending beam rate.

The linkage to the nodal point 22 should not oppose rocking motion of beam 18. A knuckle or spherical type of coupling will eliminate imposition of undesired reaction to rocking motion of the beam by the load carried by the beam.

The system illustrated in FIG. 1 is shown in FIG. 2 in one installation. In this installation, the helicopter frame has been illustrated without the pylon being shown. Helicopter fuselage 100 is characterized by a basic frame structure 101 which in this illustration is shown in diagrammatic form as an S-shaped solid beam. Beam 101 supports a roof or canopy 102 and a rear fuselage 102a. Landing gear, including skids 103, is anchored to and supported from the beam 101. An enclosing skin or bubble 105 is provided to shield the occupants and cargo from wind forces.

In accordance with the present invention, the floor (not shown) for the cabin of the fuselage 100 is to be supported substantially free of vibrations at the dominant main rotor induced frequency and at a multiple or higher harmonic, such as the six per rev harmonic. Four compound beams, of the type shown in FIG. 1, extend laterally from the main fuselage beam 101. Beams 111, 112, 113 and 114 each exhibits a dual frequency nodal point, such as at points 121, 122, 123 and 124. The floor structure for the cabin may thus be supported at points 121–124 so that cargo and personnel supported by the floor will be isolated from 2 and 6 per rev vibrations present in main beam 100.

It is known that as the helicopter hovers, it is relatively free from vibration at the 2 per rev main rotor frequency. During forward motion, vertical vibrations are induced into the fuselage 100 as indicated by arrow 130. The vibrations are characteristic of a given structure. The response of one structure will differ from the response of a different structure.

Beams 111–114 may be rigidly mounted on the fuselage to provide for support of the load carrying portion thereof as may be desired. For example, an entire cabin floor together with the cargo space, fuel, the pilot's seats and the like may be mounted free from vibration. Alternatively, only a portion of the cabin may be isolated. For example, a small cabin area in which the pilot's seats are mounted may be isolated independent of considerations relative to other load portions.

In any case, there is provided the system for multi-frequency vibration isolation of load in an aircraft wherein a primary beam is cantilevered supported from the fuselage and extends longitudinally in a plane perpendicular to the direction of vibration to be isolated and exhibits the vibrational nodal point at the primary frequency. A second beam is cantilevered supported from the primary beam in the region of the nodal point and exhibits a vibration nodal point at a location spaced from the primary beam and at a frequency which is a multiple of the primary frequency. A linkage then extends from the second nodal point to a load supporting element to be carried by the fuselage.

In FIG. 3, a suitable linkage to beam 111 having nodal point 121 has been shown. The beam 121 is provided with a spherical socket 140 to receive the ball head of a bolt 142. A plate 144 is secured to beam 121 by bolts 145 to retain the spherical head of bolt 142. By means of this connection, beam 121 may rock without opposition from the coupling through bolts 142 to the load. In the form illustrated, the load may be supported by a floor member 146 which is secured to bolt 142 between washers 148 by nuts 150.

It will be understood that elastomeric mounts may also be employed for coupling to the beam 121 to permit load support without opposing the rocking motion.

Figure 4:
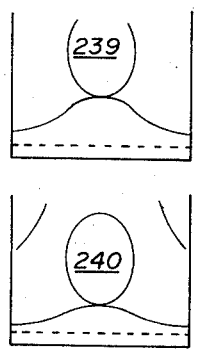
FIG. 4 is a series of graphs showing various beam vibration states.
Figure 6:
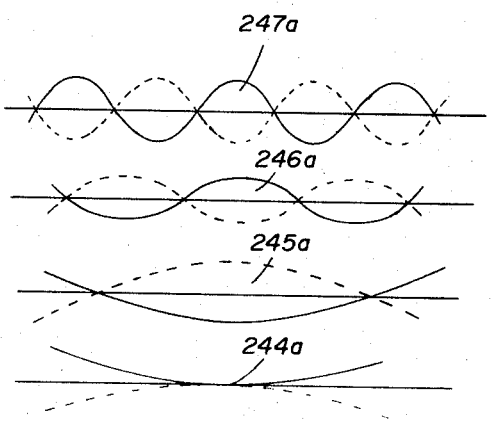
FIG. 6 illustrates different modes of vibration in the beam of FIG. 5.

Application of the present invention to the system shown in FIGS. 1–3 will be further understood by reference to FIGS. 4–6 where principles of nodalization are illustrated. In FIG. 5 a beam 230 is suspended by cords 232 from a rigid support 233. When such a simple elastic beam 230 is excited by a vibratory force 232 applied at the center of the beam 230, nodal points can be observed if the forcing frequency is above a certain value. In FIG. 4 the upper plot 234 represents the vibration of beam 230 when force 232 is applied at the center of the beam. Points of zero vibration, i.e., node points, in the horizontal plane resulting from force 231 comprise the plot 234. The abscissa for plot 234 is the beam station at which measurements of vibration are made. The center point on beam 230 corresponds to the center line of plot 234. The ordinates are plotted in terms of frequency with zero frequency at the bottom of the plot.

As the frequency of force 231, FIG. 5, increases, the location of the node points along beam 230 change. Curve 241 represents the location of the most outward node points. Curve 242 represents the location of a second set of modes which appear when vibrating in the second symmetric mode and curve 243 represents adds nodes associated with the third symmetric mode. The frequency at which line 244 is tangent to curve 241 is generally known in the art relating to vibration in simple beams as the first Frahm damper mode. At any frequency above the frequency of line 244, the beam will exhibit at least two vibration nodes, i.e., zero movement.

For the simple beam of FIG. 4, the preferred operating range for the dominant rotor vibration is represented by the range of frequencies spanned by the bar A-B. When the beam 230 is excited at frequencies within bar A-B, two nodes will be exhibited at the beam located at stations corresponding to the intersections between curve 241 and the operating drive frequency within bar A-B. The operating frequency is chosen away from the natural frequencies of the beam.

In FIG. 6 the amplitude of vibration of the beam 230, FIG. 5, has been illustrated in plot 244a, representing the first Frahm damper mode. No motion occurs here at the center of the beam where the force is applied.

Plot 245a represents the first symmetric mode as exhibited at a frequency 245, which is the natural frequency of the first mode.

Plot 246a represents the second symmetric mode such as exhibited at the natural frequency 246, FIG. 4.

Plot 247a illustrates vibration in the third symmetric mode, for example at the natural frequency 247, FIG. 4.

It is important to note that the nodal points cross the natural frequencies smoothly. At definite frequencies, the response of the beam becomes zero at the point of excitation.

It is evident from plot 234, FIG. 4, that it is possible to operate away from natural resonant frequencies in order to reduce the amplitude of the response, reducing structural loads on beam 230 with well-defined nodal points existing. Such considerations would normally lead to design a structure with a low natural frequency. On the other hand, in the case of a helicopter the structure must carry static loads with minimum deflection. This requirement tends to give the structure a high natural frequency. These two requirements, a high natural frequency, i.e., stiff beam, and low natural frequency, i.e., low response, are both satisfied in the present invention when the ratio of forcing frequency to natural frequency of the first mode is between 1.1 and 1.5. The forcing frequency is a function of the main rotor speed and the number of rotor blades. In examples of the systems of FIGS. 1–3, the frequency as mentioned above is two cycles per revolution of the rotor for two bladed rotors, although the same rules apply for n per rev for n bladed rotors. It has been determined that this rotor speed can vary more than customary operational practice would permit without shifting the nodal points appreciably.

In airframe construction, any weights attached to the in flight forced nodal points do not oscillate and do not alter the dynamics of the beam at the forcing frequency. The nodes cannot transmit oscillating forces to the supported load. Therefore, isolation is not a function of load. It is recognized that any damping will cause quadrature-phased motion of the beam. This would tend to eliminate nodes. However, it is possible to identify regions of low response on the beam. It takes large amounts of damping to eliminate usefulness of such regions for load supporting purposes.

The object of the invention then is to make use of in flight nodes by suspending loads from them. A significant advantage of this method over conventional soft mounting techniques is that much stiffer structure can be maintained with lower transmissibility. This is particularly important where controls and drive shafts, which can accommodate only limited relative motions, are attached to the moving pylon at one end and to the fuselage at the other end. This invention may be viewed as locating the in flight nodes with the loads detached and then attaching the loads to the nodal points.

From the plot 234, particularly curve 241, it will be noted that so long as the force 231, FIG. 5, is applied at a single point or effectively at the center of the beam, there can never be nodal points at the end of beam 230. This is for the reason that the curve 241 is asymptotic. There always must be some weight-beam portion beyond the nodal points of a center driven beam.

A further understanding of nodalizing will be gained from considering the plots 235–240, FIG. 4. These plots are representative of data obtained from applying forcing functions to beam 230 of FIG. 5 but with the function being applied at a pair of spaced points such as represented by member 271 which is in the form of a yoke actually driven by a force 272. The distance $x$, FIG. 5, represents the spacing between the points of application of the force 272 to beam 230. The spacing $x$ represents the spacing along the abscissa in FIG. 4. The purpose of plots 235–240 is to illustrate the variations in the vibration characteristic of the simple beam case, the center driven case represented by plot 234, as the spacing $x$ is increased.

Plot 235 represents the vibration of beam 130 for a fairly small value of $x$.

For increased spacing, plot 236 is characteristic of the change in node point locations.

In plot 237, it will be noted that at the frequency 237a, there will be nodes at the ends of the beam.

For all spacings $x$, wider than that representing the plot 237, i.e., plots 238–240, there will be nodes at the beam ends. This condition makes it possible to shorten the beam and at the same time locate the working weight portions of the beam between the nodes at which the fuselage is coupled as described in copending patent application Ser. No. 189,945, filed Oct. 8, 1971, now abandoned.

From the foregoing description of FIGS. 4–6, it will be appreciated that in the system of FIG. 1, the beam 12 may exhibit a nodal point at point 16 and thus present no vibration to beam 18 at a first frequency such as that corresponding to the 2 per rev forces. By supporting a load at point 22 on beam 18 at a node corresponding to the 6 per rev node, there will be eliminated from the load any vibration at either 2 per rev or 6 per rev frequencies.

While in FIGS. 1 and 2 compound beams have been illustrated, it is to be understood that it may be possible to so form a single beam that it presents a node at both the 2 per rev and 6 per rev frequencies at the same point on a beam. That such possibilities exist is indicated by the fact that nodes on plot 247a correspond roughly with the location of nodes on plot 245a. When such points are caused to coincide on a beam, then a simple beam can be employed for eliminating vibrations at two frequencies.

Having described the invention in connection with certain specific embodiments thereof, it is to be understood that further modifications may now suggest themselves to those skilled in the art, and it is intended to cover such modifications as fall within the scope of the appended claims.

What is claimed is:

1. A system for multi-frequency vibration isolation of a load in an aircraft which comprises:
   a. a first beam cantilever supported from said fuselage and extending longitudinally in a plane perpendicular to the direction of vibration to be isolated and exhibiting a vibration node at a primary frequency,
   b. a second beam cantilever supported from said primary beam in the region of said node and exhibiting a vibrational node at a location spaced from said first beam and at a frequency which is a multiple of said primary frequency, and
   c. linkage means supporting said load in the region of said second node.

2. The combination set forth in claim 1 wherein the linkage to said secondary beam includes structure permitting rocking of said beam without opposition by said linkage.

3. The combination set forth in claim 1 wherein the linkage to said beam is a ball and socket linkage which permits rocking of said beam unopposed by said linkage.

4. The combination set forth in claim 1 wherein said aircraft is a helicopter having a main rotor and said first beam in vibration exhibits a node at the frequency of $n$ per rev where $n$ is the number of blades in said rotor and wherein said second beam in vibration exhibits a node at $xn$ per rev where x is an integer.

5. The combination set forth in claim 4 wherein $n = 2$ and $x = 3$.

6. A system for multi-frequency vibration isolation of the load in a helicopter having a fuselage supported in flight by a pylon drawn rotor which comprises:
   a. a plurality of main beams each cantilevered supported from the fuselage extending in a plane perpendicular to said pylon with each said beam tuned to vibrate in a mode such that at normal operating speed of said rotor vibration nodes occur at a point spaced from said fuselage in each of said beams,
   b. a secondary beam supported from each main beam in the region of said node and each exhibiting a vibrational node at a point spaced from its primary beam and at a frequency which is a multiple of said primary frequency, and
   c. linkages coupled to each of said secondary beams, one linkage at each secondary beam node point and supporting said load.

7. The combination set forth in claim 6 wherein each of said primary beams and said secondary beams are tuned by weights at the free ends thereof.

* * * * *